(12) United States Patent
Marshall et al.

(10) Patent No.: US 12,332,406 B2
(45) Date of Patent: *Jun. 17, 2025

(54) HYDROPHILIC-LIKE SPUTTERED AR COATING

(71) Applicant: HOYA Optical Labs of America, Inc., Lewisville, TX (US)

(72) Inventors: Michael Marshall, Andover, MN (US); Jeffrey Brown, St. Louis Park, MN (US)

(73) Assignee: HOYA Optical Labs Of America, Inc., Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,763

(22) Filed: Apr. 8, 2024

(65) Prior Publication Data

US 2024/0288609 A1 Aug. 29, 2024

Related U.S. Application Data

(63) Continuation of application No. 16/927,830, filed on Jul. 13, 2020, now Pat. No. 11,960,057.

(60) Provisional application No. 62/873,779, filed on Jul. 12, 2019.

(51) Int. Cl.
*G02B 1/115* (2015.01)
*G02B 1/18* (2015.01)

(52) U.S. Cl.
CPC ............... *G02B 1/115* (2013.01); *G02B 1/18* (2015.01)

(58) Field of Classification Search
None
See application file for complete search history.

(56) References Cited

U.S. PATENT DOCUMENTS

| 5,728,456 | A | 3/1998 | Adair et al. |
| 6,830,785 | B1 | 12/2004 | Hayakawa et al. |
| 7,527,867 | B2 | 5/2009 | Aumercier et al. |
| 2002/0051294 | A1 | 5/2002 | Katayama et al. |
| 2003/0048538 | A1 | 3/2003 | Tonar et al. |
| 2007/0279750 | A1 | 12/2007 | Yaoita et al. |
| 2009/0029179 | A1 | 1/2009 | Fukada et al. |
| 2013/0182328 | A1 | 7/2013 | Stewart et al. |
| 2015/0146161 | A1 | 5/2015 | Rigato et al. |
| 2017/0306475 | A1 | 10/2017 | Imoto et al. |

(Continued)

FOREIGN PATENT DOCUMENTS

| CN | 1890585 A | 1/2007 |
| WO | WO 2008/110560 A1 | 9/2008 |

OTHER PUBLICATIONS

Japanese Patent Office, Office Action dated Mar. 14, 2024 with English translation in Japanese Patent Application No. 2022-501224, 20 pages.

(Continued)

*Primary Examiner* — Prashant J Khatri
(74) *Attorney, Agent, or Firm* — Inskeep IP Group, Inc.

(57) ABSTRACT

An ophthalmic article having a coating system which provides antireflective and easy clean properties to the ophthalmic article. The coating system includes alternating layers of low refractive index metal oxide and high refractive index metal oxynitrides and corresponding high refractive index metal oxides. The coating system provides favorable surface energy to the ophthalmic article when at least one layer of the high refractive index metal oxynitride is encapsulated between two layers of low refractive index metal oxide.

16 Claims, 9 Drawing Sheets

(56) References Cited

U.S. PATENT DOCUMENTS

2018/0067337 A1     3/2018   Brown et al.
2018/0321425 A1     11/2018   Hart et al.

OTHER PUBLICATIONS

WIPO, U.S. International Search Authority, International Search Report and Written Opinion mailed Oct. 7, 2020 in International Patent Application No. PCT/US2020/041847, 11 pages.
Lan, Yucheng, et al., "Mini review on photocatalysis of titanium dioxide nanoparticles and their solar applications," *Nano Energy*, (2013) 2, 1031-1045, 15 pages.
Hashimoto, K. et al., "$TiO_2$ Photocatalysis: A Historical Overview and Future Prospects," *Japanese Journal of Applied Physics*, vol. 44, No. 12 (Jul. 2005), pp. 8269-8285, 17 pages.
Asahi, R. et al., "Visible-Light Photocatalysis in Nitrogen-Doped Titanium Oxides," *Science*, vol. 293, Jul. 13, 2001, pp. 269-271, 3 pages.
Rawal et al., "Effect of Power Variation on Wettability and Optical Properties of Co-Sputtered Titanium and Zirconium Oxynitride Films", Bull Mater Sci 36, 403-409 (2013).E.
European Patent Office, Communication pursuant to Article 94(3) EPC dated Mar. 11, 2025 in European Patent Application No. 20841334.4, 5 pages.

| Material | Refractive Index @ 546nm | Thickness (nm) | Surface roughness (nm) |
|---|---|---|---|
| ZrOxNy | 2.1276 | 202.93 | 4.43 |
| ZrO₂ | 2.1308 | 189.0 | 3.80 |

|  | Product | % Haze | | | | Cleanability Ratio |
| --- | --- | --- | --- | --- | --- | --- |
|  |  | Initial with Sebum | 6 Strokes | 12 Strokes | 18 Strokes |  |
| Hydrophobics | Comp-1 | 44.6 | 17.5 | 15.7 | 13.2 | 70% |
| | Comp-2 | 37.6 | 13.3 | 13.6 | 12.4 | 67% |
| | Comp-3 | 32.8 | 20.3 | 19.2 | 16.4 | 50% |
| | Comp-4 | 39.6 | 26.8 | 20.3 | 19.8 | 50% |
| | Comp-5 | 35.8 | 28.8 | 20.5 | 14.8 | 59% |
| | Comp-6 | 32.3 | 30.1 | 29.1 | 26.9 | 17% |
| Easy Clean/ Antifouling | Coating from US20150226886 | 31.3 | 6.3 | 3.7 | 2.6 | 92% |
| | Hydrophil AR | 50.6 | 7.4 | 2.9 | 2.6 | 95% |

Figure 17

HYDROPHILIC-LIKE SPUTTERED AR COATING

RELATED APPLICATIONS

This application is a continuation of and claims priority to U.S. patent application Ser. No. 16/927,830 filed Jul. 13, 2020 entitled Hydrophilic-Like Sputtered AR Coating, which claims benefit of and priority to U.S. Provisional Application Ser. No. 62/873,779 filed Jul. 12, 2019 entitled Hydrophilic-Like Sputtered AR Coating, both of which are hereby incorporated herein by reference in their entireties.

FIELD OF THE INVENTION

The present invention is directed to optical coatings and, more particularly, to hydrophilic-like sputtered coatings that are easy to clean and anti-reflective.

BACKGROUND OF THE INVENTION

One or more functional coatings can be applied to a surface of an ophthalmic article in order to impart different properties or characteristics to its surface. Such properties or characteristics imparted by the coatings may include color, gloss, reflectivity, abrasion resistance, optical clarity, water repellency, resistance to fogging, anti-reflectivity, resistance to soiling, and ease of cleaning. Of these various properties, the surface properties or characteristics of ease of cleaning and anti-reflectivity have potentially broad applications in ophthalmic industries.

Dirt, oil, and dust are the major contaminants that build up an ophthalmic lens. Depending on the wearer's environment, the type of ophthalmic lens coatings, and materials needed to clean them, the removal of these contaminants is ongoing and often challenging.

In order to keep the surfaces of the ophthalmic lenses clean, many manufacturers employ the use of hydrophobic coatings on these lenses and market the hydrophobic coatings as being more slippery or hydrophobic on their surface than competing eyewear and therefore is easier to clean. However, market surveys reveal that that these easy-cleaning coating technologies using hydrophobic or slippery lens surfaces do not perform at expected levels for several reasons.

The first reason is that a hydrophobic or slippery surface does not necessarily mean that oil and dirt always fall off or are easy to remove. Instead, oil & dirt tend to be easier to move around on the surface and in absence of friction from the surface, they tend to smear over the surface of the lens.

The second reason is that the current easy-cleaning coating technologies using hydrophobic surfaces are chiefly directed towards achieving the highest possible contact angles for both water and oils. The reason for these high contact angles is due to correlations between high contact angles for water and oil, and surface resistance to smudges, fingerprints, and ease of cleaning. Generally, a contact angle of the water of >110° pre rub and >105° post rub is normally used. However, the high contact angle does not always indicate an easy to clean surface since the oils mixed with dirt tend to move or smear across the slippery lens surface.

The third reason is that the hydrophobic surface performance may not be maintained over a long time. The hydrophobic coating deteriorates or abrades off overtime during the lens cleaning. When this happen, oils and dirt build up on the lens and can be difficult to remove without the use of soap or similar cleaning solutions.

Typically, these hydrophilic coatings rely on the photocatalytic activity of the coating, the most common of this nature being a coating of titania or titanium dioxide ($TiO_2$). As a wide band semiconductor, $TiO_2$ absorbs light in the UV wavelengths. The absorption process generates electron-hole pairs and the photo-generated holes are the cause of the hydrophilicity of the coating surface (water contact angle below 10°). The trapping of contaminants like water or oils by the holes lead to the formation of charged species, for example, hydroxyl ions and hydroxyl radicals, by oxidation. These charged species can have several effects: a) they can generate hydrophilicity on the surface (through surface reorganization if $TiO_2$ increases the density of hydroxyl radicals on the surface); b) they can provide a self-cleaning mechanism via oxidation of surface contaminants; and c) catalytic effects for conversion of pollutants to nonhazardous materials.

The photocatalytic effect of a $TiO_2$ coating is the subject of many patents including US2003/0048538 A1, U.S. Pat. Nos. 7,527,867, 5,854,708, and 6,830,785, the contents of which are hereby incorporated by reference. In these patents, the photocatalytic properties of $TiO_2$ are used to provide increased hydrophilicity (water contact angle below 10°) and in some cases a self-cleaning mechanism that helps to maintain the hydrophilic properties when the surface becomes soiled.

In some cases, silicon dioxide ($SiO_2$) is either added into the photocatalytic $TiO_2$ as a dopant, as seen in U.S. Pat. No. 6,830,785, or as a layer on top of $TiO_2$, as seen in US2003/0048538 A1, the contents of which are hereby incorporated by reference, in order to enhance the hydrophilic behavior of the $TiO_2$ coating. The use of oxy-nitrides of titanium ($TiO_xN_y$) as a photocatalyst is also discussed in the publication by Asahi ["Visible Light Photo catalyst in Nitrogen Doped Titanium Oxides", Asahi, Morikawa, Ohwaki, Aoki, Taga, Science 293 pg. 269], the content of which is hereby incorporated by reference. By adding nitrogen, the bandgap of the semiconductor is narrowed such that absorption of high energy visible light is able to generate electron hole pairs. The presence of photocatalytic behavior with TiOxNy is similar to $TiO_2$ when exposed to UV irradiation. However, the photocatalytic effects observed with $TiO_xN_y$ (with either UV or visible illumination) are substantially weaker than that of $TiO_2$ under UV illumination. In other words, $TiO_xN_y$ as a photocatalytic material is not as efficient as $TiO_2$ when converting photons into the desired change in surface energy or reactivity.

However, these types of hydrophilic coatings are typically not durable over longer periods of time and cannot be used in applications where abrasion is present. In addition, in these types of hydrophilic coatings, the surface energy of the ophthalmic surface decreases over time and eventually approaches zero, and therefore the hydrophilic coatings no longer provide favorable surface energy to facilitate easy cleaning property of the ophthalmic lens.

Hence, there exists a need to develop coatings and coating systems that overcome the disadvantages of prior hydrophilic coatings by providing both improved cleaning characteristics and improved durability over longer periods of time.

SUMMARY OF THE INVENTION

The present invention provides coatings and coating systems that impart effective easy-cleaning properties to a surface of an ophthalmic article. According to some embodiments, the coating system of the ophthalmic article is achieved by providing a substrate having a surface and a plurality of alternating low refractive index layers comprising a metal oxide which includes silicon dioxide and high refractive index layers. The alternating high refractive index layers comprise a second metal oxide which includes titanium dioxide or zirconium dioxide, and at least one metal oxynitride comprising titanium oxynitride or zirconium oxynitride, all of which are deposited on the surface of the substrate. In this coating arrangement, the ophthalmic article comprises a surface free energy in a range of about 50-70 mN/m for a prolonged period for example, nearly 40 days, when said at least one high refractive index titanium oxynitride or zirconium oxynitride is encapsulated between two layers of the silicon dioxide having low refractive index.

According to some embodiments of the present invention, a high index Metal oxynitride (titanium or zirconium) is engineered into a modified anti-reflection optical stack to function as a hydrophilic type surface to increase its cleanability or an optical article. The layers are preferably constructed within the antireflection (AR) optical stack so that no other layers outside the AR stack are needed to make the optical article easier to clean. Metal oxy-nitrides films, when used in combination and encapsulated between silicon dioxide generate the hydrophilic properties based on the nitrogen-to-oxygen ratio during sputtering of the thin film AR.

In some embodiments of the present invention, a method of making an ophthalmic article having easy-clean and anti-reflective properties is described. The method comprises providing a substrate having a first surface and a plurality of alternating layers of low refractive index metal oxide and high refractive index metal oxide and metal oxynitride are formed on the first surface. The plurality of alternating layers further comprises at least one high refractive index metal oxynitride encapsulated between two layers of low refractive index metal oxide. An easy-cleaning property is imparted to the ophthalmic through the encapsulation of at least one high refractive index layer of metal oxynitride between the two layers of low refractive index metal oxide. A surface cleanability ratio of the ophthalmic article in this coating system is preferably greater than 90%.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present invention provides a coating system of an ophthalmic article which comprises at least a coated layer of a high refractive index metal oxynitride. The presence of at least a layer of metal oxynitride into an antireflective optical stack of the ophthalmic article provides a favorable surface energy to render the surface hydrophilic in nature which enhances an easy clean property of the surface of the ophthalmic article from dirt, skin oil, and dust. The ophthalmic articles to which the easy-cleaning coating or layer of the present invention can be applied include but are not limited to glass, plastics, metals, painted or colored surfaces, and other materials where cleanability is desirable.

In some embodiments of the present invention, an easy cleaning coating or layer comprises at least a layer of high refractive index titanium oxynitride or zirconium oxynitride which provides a surface of an ophthalmic article with long lasting increased surface energy. In some embodiments, the easy clean and antireflective optical stack of the ophthalmic article comprises at least a layer of a titanium oxynitride or zirconium oxynitride along with layers of silicon dioxide. In some other embodiments, the easy clean and antireflective optical stack of the ophthalmic article comprises at least a layer of a titanium oxynitride or zirconium oxynitride along with layers of silicon dioxide and titanium dioxide or zirconium dioxide.

In some embodiments of the present invention, a process to prepare an antireflective stack with easy clean property comprises using a DC pulse sputtering at 150 Khz in vacuum to deposit at least one layer of a high refractive index titanium oxynitride or zirconium oxynitride into low refractive index layers of silicon dioxide. In some embodiments, the surface of an easy clean and antireflective optical stack of the ophthalmic article generates controlled hydrophilic surface energy when at least a layer of a high refractive index titanium oxynitride or zirconium oxynitride is being encapsulated between two layers of low refractive index silicon dioxide in the optical stack.

According to some embodiments, a non-limiting example of a standard antireflective and easy clean stack design employs a five layer structure of a L/H/L/H/L stack, where L is a low refractive index silicon dioxide layer, and H is a high refractive index layers of titanium oxynitride, zirconium oxynitride, titanium dioxide or zirconium dioxide. In some embodiments, the ophthalmic article generates long lasting and controlled hydrophilic surface energy when at least a high refractive index layer comprises a titanium oxynitride or zirconium oxynitride layer.

In some embodiments of the present invention, preparation of a titanium oxynitride or zirconium oxynitride layer includes sputter deposition from a metal target of titanium or zirconium in presence of oxygen and nitrogen to form the desired metal oxynitride layer. In some embodiments of the present invention, preparation of a low refractive index material of silicon dioxide includes sputter deposition from a silicon target in presence of oxygen to deposit silicon dioxide.

In some embodiments of the present invention, a standard vivid 5/7 CX/CC (CC-concave, CX-convex) and zirconium with 99.98% purity as the high refractive index metal is used for sputtering. In some embodiments, a silicon with 99.999% purity as low refractive index material is used for sputtering. In some other embodiments, silicon is doped with 6% boron as low refractive index material for all the controlled testing.

In some embodiments of the present invention, the sputtered gases comprise argon, oxygen, and nitrogen at any given process flows. According to some embodiments, a mass flow controller used during the processes is 50 sccm for both argon and oxygen flows. When nitrogen is used as a sputtered gas, a 5 sccm mass flow controller is used instead of a 50 sccm, because a small flow of 3.5 sccm is needed to coat the nitride. In some embodiments of the present invention, an adhesive layer of a silicon process is at about 20-30 angstroms during the testing.

In some embodiments, a method for making a metal oxynitride is performed by using a DC pulse Magnetron sputtering with metal mode using a reactive plasma barrel. The sputtering system used in this invention is detailed in the U.S. patent application 2014/074912, the content of which is incorporated herein by reference. In the process of sputtering, the material is applied as a very thin metal and is rotated through a reactive plasma. Due to the construction of the plasma source and the cathode placement, the majority of species of gas can be delivered at the cathode or in the plasma barrel. In some embodiments, an inert gas, for example, argon, and a reactive gas, such as nitrogen, is delivered at the cathode and another reactive gas, such as oxygen, is delivered at the plasma barrel. In some embodiments, a 2.5 to 3.5 sccm mass flow controller is sufficient to get a metal oxynitride layer in a consistent process. In this invention, all samples are prepared using a Mycoat DC pulsed sputtering system with metal-mode plasma barrel for reaction of the metal film into oxides or oxynitrides.

In this invention, the anti-reflective color specification is used in the test which is tracked from zero hours and over a period of time. Furthermore, in this invention, the hydrophilic antireflective processes are used with a number of different lens types. The non-limiting examples of such lenses are Polycarbonate Tegra and Clear Blue Filter, CR39 with high refractive index of 1.67 and 1.70 respectively. The original antireflective recipe is modified for color and spectra adjustments as needed for specifications which had little effect on the surface energy and cleanability results.

In some embodiments of the present invention, the high refractive index layers of titanium oxynitride or zirconium oxynitride work in three folds in the antireflective stack of the ophthalmic article. A first way is the change in surface morphology during the growth of a thin film layer of titanium oxynitride or zirconium oxynitride in the stack. In some embodiments, a 10 nm thickness of a thin film layer of titanium oxynitride or zirconium oxynitride work the same as a 100 nm thickness of a thin film layer of titanium oxynitride or zirconium oxynitride in the context of surface energy and/or surface morphology. In some embodiments, the placement of a thin film layer of titanium oxynitride or zirconium oxynitride in the anti-reflective optical stack changes how the overall optical stack behaves in terms of cleanability and surface free energy. According to some embodiments, a non-limiting example of a standard antireflective and easy clean stack design employs a five layer structure of L/H/L/H/L stack, where L is a low index refractive index silicon dioxide layer, and H is a high refractive index layer of at least a titanium oxynitride or zirconium oxynitride coating. In this regard, high refractive index means an index of refraction that is approximately greater than about 1.7 at a referenced wavelength, for example a wavelength of about 550 nanometers. Low refractive index means an index of refraction that is approximately less than about 1.5 at a referenced wavelength, for example a wavelength of about 550 nanometers. This type of columnar growth of a L/H/L/H/L stack also increases the surface area and the increase in surface area plays a role in achieving a controlled surface free energy (SFE) which eventually leads to an increase in easy clean property of the ophthalmic article. The columnar growth may also result in an increased coefficient of friction on the surface, resulting in a "grabby feel" to the lens surface.

A second way the presence of the metal (Ti/Zr) oxynitride layer/layers influence the antireflective stack is by providing a controlled surface free energy of the total optical antireflection stack. In some embodiments, the presence of the metal (Ti/Zr) oxynitride layer/layers influence the antireflective stack by providing a controlled surface energy in a range of about 50-70 mn/m. In such embodiments, in which the controlled surface energy in a range of about 50-70 mn/m, each layer of the metal (Ti/Zr) oxynitride layer/layers interact with the other optical stack layers and contributes to the overall surface free energy of a hydrophilic surface and general cleanability of the surface.

A third way the presence of the metal (Ti/Zr) oxynitride layer/layers influence the hydrophilicity of the surface is by suspected photocatalytic properties of the titanium or zirconium oxynitride layer by photo-generating holes in presence of sunlight (photons) and thereby creating OH radicals by oxidizing surface water and oils by these holes.

Figure 1:
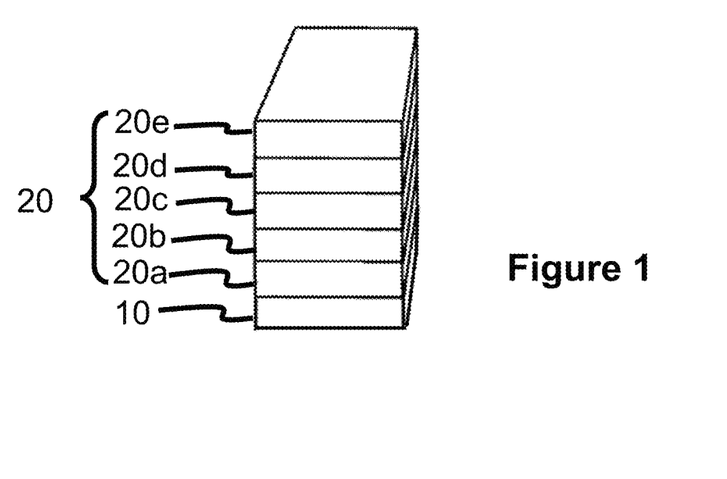
FIG. 1 is a perspective view of a coated substrate according to one embodiment of the present invention.

Referring now to FIG. 1 of this invention, this figure shows an embodiment in which a surface of an article 10 (e.g., an optical lens) is provided with a durable anti-reflective coating with easy-cleaning properties. According to this embodiment of FIG. 1, a coating system 20 comprising a five layer stack of alternating L/H/L/H/L layers, where L is a low refractive index silicon dioxide layer (20a, 20c, 20e) and H is a high refractive index layer (20b or 20d), at least one of which is composed of titanium oxynitride or zirconium oxynitride (20b or 20d). The other high refractive index layer(s) may be a titanium dioxide, zirconium dioxide, titanium oxynitride, or zirconium oxynitride layer. The pre-tuned anti-reflective and easy clean stack 20 may employ, for example, at least three layers alternating between high and low index refractive layers, but may also not necessarily be limited in the number of alternating layers (e.g., the stack 20 may include 3, 4, 5, 6, 7, 8, 9, 10, 11, 12, 13, 14, 15, 16, or greater numbers of layers). In this respect, the stack may have layers 20n where n equals the number of layers present.

For example, the refractive layers 20n may comprise alternating layers of low refractive index silicon dioxide and high refractive index titanium oxynitride. In another example, the refractive layers 20n may comprise alternating layers of low refractive index silicon dioxide and 1) one or more layers of high refractive index titanium oxynitride, and 2) one or more layers of high refractive index high refractive index titanium dioxide. In another example, the refractive layers 20n may comprise alternating layers of low refractive index silicon dioxide and high refractive index zirconium oxynitride. In another example, the refractive layers 20n may comprise alternating layers of low refractive index silicon dioxide and 1) one or more layers of high refractive index zirconium oxynitride and 2) one or more layers of high refractive index zirconium dioxide. In all the embodiments of the present invention, the easy clean and antireflective optical stack of the ophthalmic article comprises at least a layer of a high refractive index titanium oxynitride or zirconium oxynitride along with layers of low refractive index silicon dioxide and high refractive index layers of titanium dioxide or zirconium dioxide. In some embodiments, at least a layer of a high refractive index titanium oxynitride or zirconium oxynitride (FIG. 1, 20b or 20d) is encapsulated between two layers of low refractive index silicon dioxide (20a, 20c, 20e) within the stack.

Figure 2:
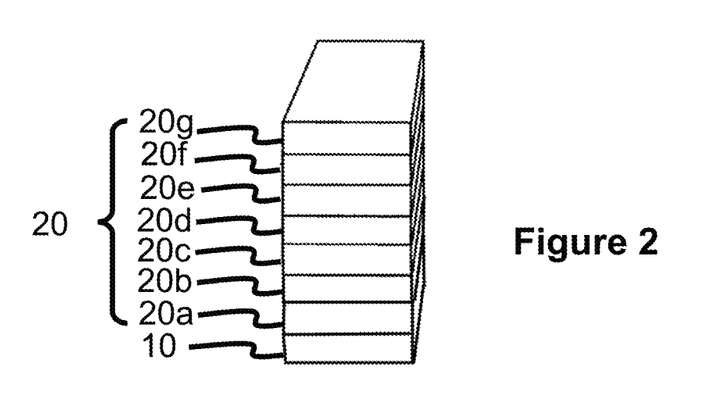
FIG. 2 is a perspective view of a coated substrate according to another embodiment of the present invention.

FIG. 2 shows an alternative example of an embodiment of the invention in which a coating system 20 comprises a seven layer stack of alternating L/H/L/H/L/H/L layers, where L is a low index refractive index silicon dioxide layer (20a, 20c, 20e, 20g) and H is a high refractive index layer, wherein at least one of the high refractive index layers is a titanium oxynitride or zirconium oxynitride (20b or 20d or 20f) coating/layer. The other high refractive index layers may be titanium dioxide or zirconium dioxide layers. The pre-tuned anti-reflective and easy clean stack 20 may employ, for example, at least three layers alternating between high and low index refractive layers, but may also not necessarily be limited in the number of alternating layers (e.g., the stack 20 may include 3, 4, 5, 6, 7, 8, 9, 10, 11, 12, 13, 14, 15, 16, or greater numbers of layers). In this respect, the stack may have layers 20n where n equals the number of layers present.

Figure 3:
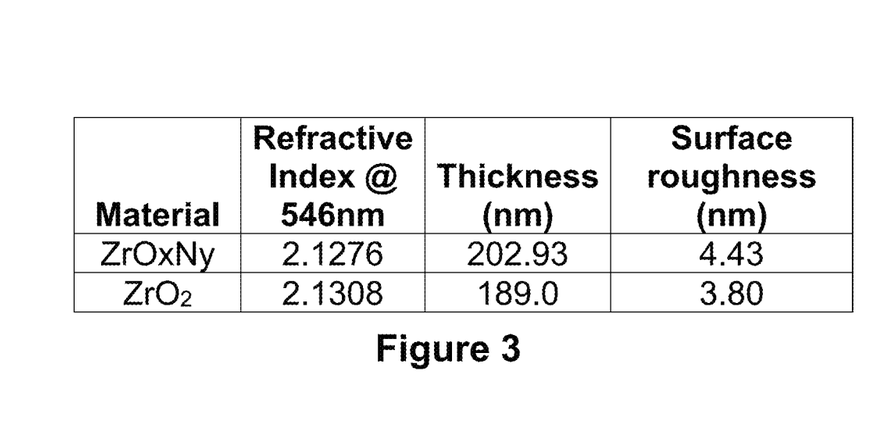
FIG. 3 is a table showing the differences among refractive index, thickness and surface roughness between zirconium oxide and zirconium oxynitride.

Referring now to the table of FIG. 3, this table compares the difference of refractive index, thickness, and surface roughness between high refractive index layers of zirconium oxynitride and zirconium oxide and an ellipsometer is used to measure this data. The thin films of zirconium oxynitride and zirconium dioxide are coated and measured on fused silica. The silica is normalized out of the measurement. The data shows very little difference in the index of refraction (e.g., a difference of 0.0032) and optical composition of the materials between layers of zirconium oxynitride and zirconium dioxide but column 3 in the table shows that there is a surface roughness difference between zirconium oxynitride and zirconium dioxide (e.g., a difference of about 0.63 nm). The high refractive index coating of zirconium oxynitride has a surface roughness of 4.43 nm, which higher than the surface roughness of 3.80 nm of the high refractive index zirconium dioxide coating. Since increased surface roughness typically correlates with a more hydrophilic surface, the high refractive index coating of zirconium oxynitride with a higher surface roughness of 4.43 nm tends to be more hydrophilic in nature compared to the high refractive index coating of zirconium dioxide with a surface roughness of 3.80 nm.

Figure 4:
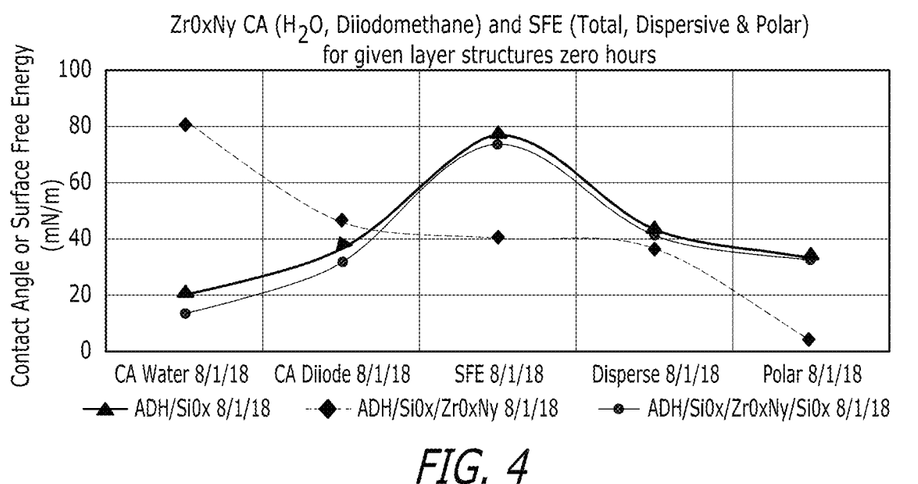
FIG. 4 is a graph showing the combined plots of the measured contact angles (of water and diiodomethane) and the calculated surface energies (total, dispersive, and polar) on surfaces freshly coated with layers of silicon dioxide, freshly coated with layers of silicon dioxide and zirconium oxynitride and freshly coated with encapsulated zirconium oxynitride between two silicon dioxide layers.
Figure 5:
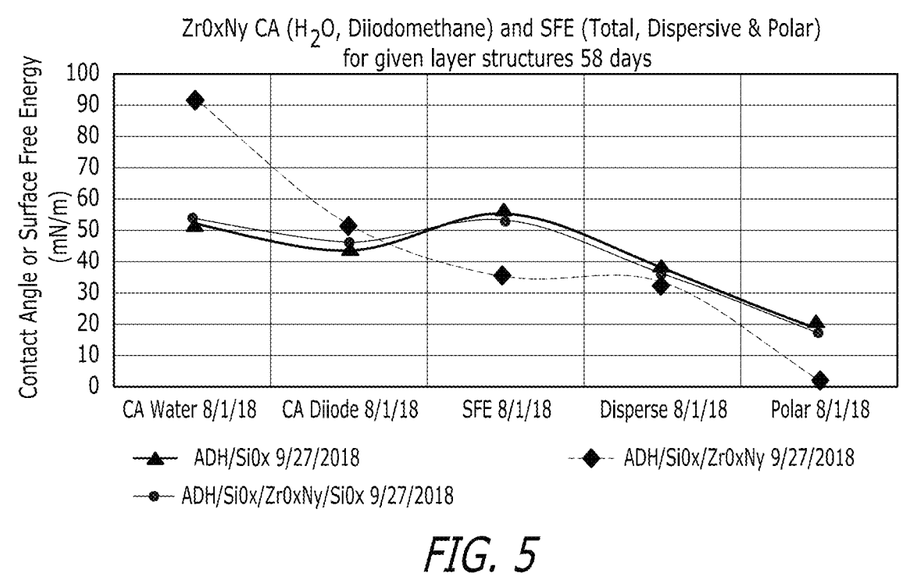
FIG. 5 is a graph showing the combined plots of the measured contact angles (of water and diiodomethane) and the calculated surface energies (total, dispersive, and polar) the surface coated with layers described in FIG. 4 after 58 days of the experiment.

FIG. 4 illustrates a graphical representation of both the measured contact angles (in water and diiodomethane) and the calculated surface free energies (total, dispersive, and polar) of the layers of silicon dioxide, layers of silicon dioxide with zirconium oxynitride, and a layer of zirconium oxynitride encapsulated between layers of silicon dioxide. Note, the date Aug. 1, 2018 refers to the sample creation date (i.e. zero hour measurement). In FIG. 4, an anti-reflective, easy clean stack from single layers of high refractive index and low refractive index materials of different thickness are assembled and the contact angles (in water and diiodomethane) and the total surface free energies (total, dispersive, and polar) are measured with a goniometer. The experiment shows that the change in contact angles and the total surface free energies depend upon the layers and the sequences of the individual layers. Herein, the total surface free energy is made up of the dispersive and polar energy components. Atoms and molecules which causes the surface energy/tension of a substance can be explained by different types of interactions among atoms and molecules on the surfaces. For example, interactions caused by temporary fluctuations of the charge distribution in the atoms/molecules are called dispersive interactions (for example, van der Waals interaction) and contributes as the dispersive free energy towards the total surface free energy. However, the polar interactions comprise Coulomb interactions between permanent dipoles and between permanent and induced dipoles (for example, hydrogen bonds) and contributes as the polar free energy towards the total surface free energy. Therefore, the surface energy/tension of components is additively made up of dispersive and polar energy of the surfaces. FIG. 5 refers to a graphical representation of both the measured contact angles (in water and diiodomethane) and the calculated surface free energies (total, dispersive, and polar) of the surfaces of silicon dioxide, layers of silicon dioxide with zirconium oxynitride, and a layer of zirconium oxynitride encapsulated between layers of silicon dioxide. Note, the date Sep. 27, 2018 refers the measurement date after 58 days of the sample creation date of Aug. 1, 2018 shown in FIG. 4. FIG. 5 shows that the measured contact angles of the layer of zirconium oxynitride grown on a single silicon dioxide layer is higher than the layer of zirconium oxynitride encapsulated between layers of silicon dioxide in water and diiodomethane. Whereas, the calculated surface free energy and the polar free energy of the layer of zirconium oxynitride encapsulated between layers of silicon dioxide is higher than when single layer of zirconium oxynitride is grown on silicon dioxide alone (i.e., non-encapsulated) after 58 days of the start of the experiment. It may be noted from FIG. 5 that the dispersive free energies do not change much over time between zirconium oxynitride encapsulated between layers of silicon dioxide and single layer of zirconium oxynitride grown on silicon dioxide alone (i.e., non-encapsulated). The encapsulation of the layer of high refractive index zirconium oxynitride between layers of low refractive index silicon dioxide has a significant effect on the polar component of the surface free energy which has been shown in the later part of this invention.

Figure 6:
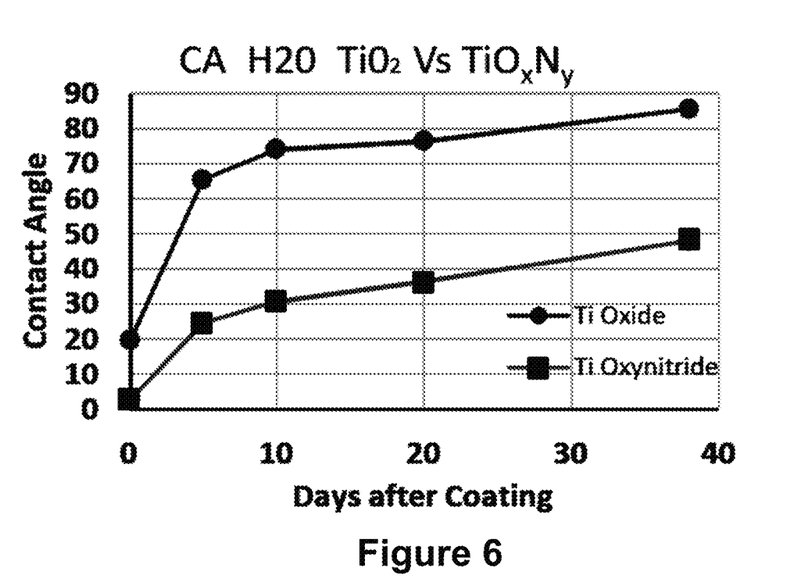
FIG. 6. is a comparative graph showing contact angles of water over time on surfaces when coated with AR coatings containing $SiO_2$ and either titanium oxide or titanium oxynitride. The outer most layer is $SiO_2$ in the stack design.
Figure 7:
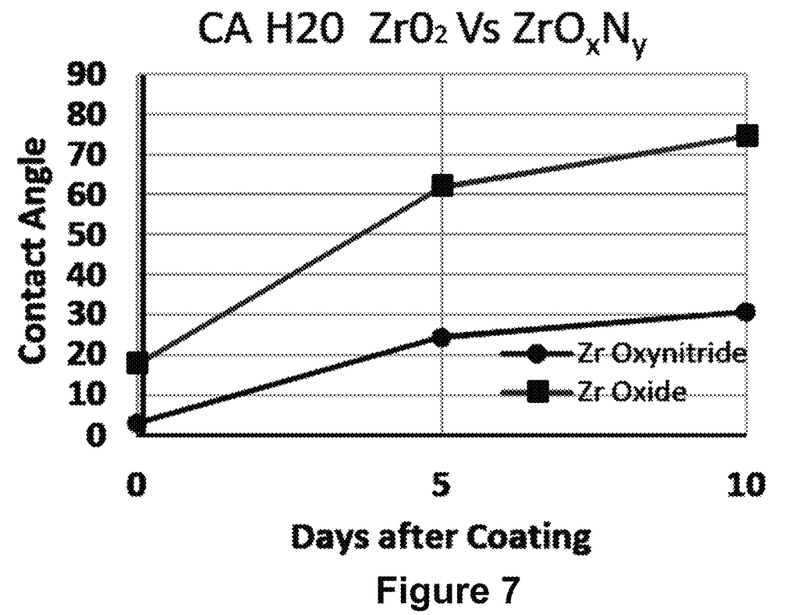
FIG. 7 is a comparative graph showing contact angles of water over time on surfaces when coated with an AR stack containing $SiO_2$ and either zirconium oxide or zirconium oxynitride. The outer most layer is $SiO_2$ in the stack design.

FIGS. 6 and 7 of this invention show a comparison of the measured contact angles of deionized water over a period of time between high refractive index layers of titanium dioxide and titanium oxynitride (FIG. 6) and high refractive index layers of zirconium dioxide and zirconium oxynitride (FIG. 7). In this comparative experiment, a normal vivid alternating 5/7 layer stack with the high index layers of zirconium dioxide and low index layers of silicon dioxide is used as the baseline. FIG. 6 shows that the measured contact angles of deionized water for the stack of titanium dioxide layers are much higher than the measured contact angles of deionized water for the stack of titanium oxynitride layers after 10 days, 20 days and more than 35 days of the start of the experiment. Similarly, FIG. 7 shows that the measured contact angles of deionized water for the stack of zirconium dioxide layers are much higher than the measured contact angles of deionized water for the stack of zirconium oxynitride layers after 5 days and 10 days of the start of the experiment.

Figure 8:
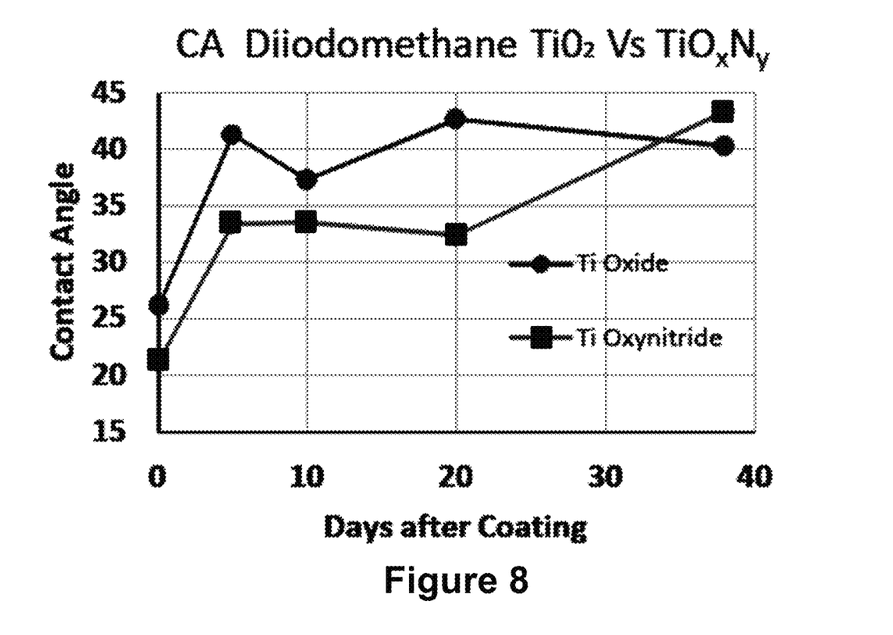
FIG. 8 is a comparative graph showing contact angles of diiodomethane over time on surfaces when coated with and AR coating containing $SiO_2$ and either titanium oxide or titanium oxynitride. The outer most layer is $SiO_2$ in the stack design.
Figure 9:
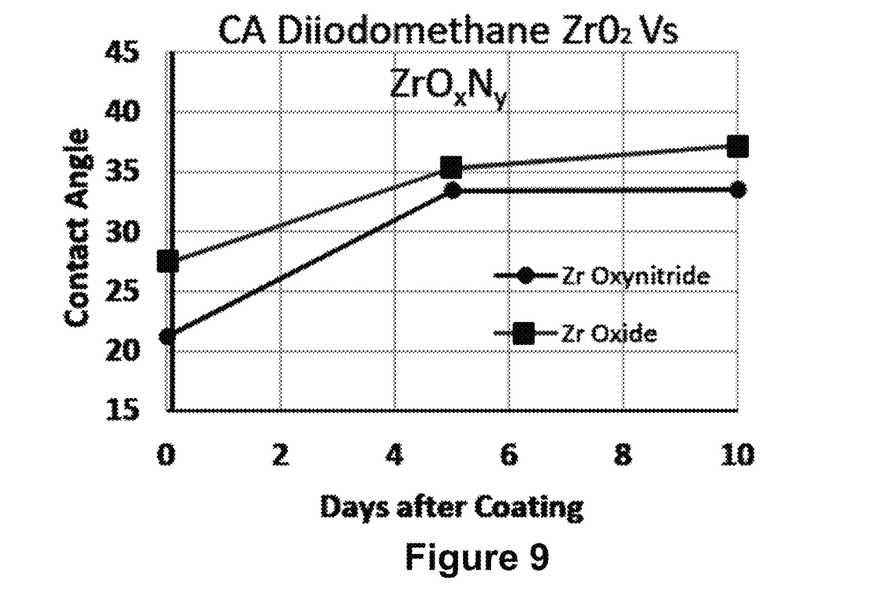
FIG. 9 is a comparative graph showing contact angles of diiodomethane over time on surfaces when coated with an AR coating with $SiO_2$ and either zirconium oxide or zirconium oxynitride. The outer most layer is $SiO_2$ in the stack design.

Referring to FIGS. 8 and 9 of this invention, these figures show comparison of the measured contact angles of diiodomethane over a period of time between high refractive index layers of titanium dioxide and titanium oxynitride (FIG. 8) and high refractive index layers of zirconium dioxide and zirconium oxynitride (FIG. 9). In this comparative experiment, a normal vivid 5/7 layers stack with the high index layers of zirconium dioxide and low index layers of silicon dioxide is used as the baseline. FIG. 8 shows that the measured contact angles of diiodomethane for the stack of titanium dioxide layers are much higher than the measured contact angles of diiodomethane for the stack of titanium oxynitride layers after 10 days and 20 days and 30 days of the start of the experiment. Similarly, FIG. 9 shows that the measured contact angles of diiodomethane for the stack of zirconium dioxide layers are much higher than the measured contact angles of diiodomethane for the stack of zirconium oxynitride layers after 5 days and 10 days of the start of the experiment.

The measurements of the contact angles shown in FIGS. 6-9 are then used to determine the total surface free energy (SFE) and the dispersive and polar components surface energy of the surfaces in the experiments shown in the following FIGS. 10-15.

Figure 10:
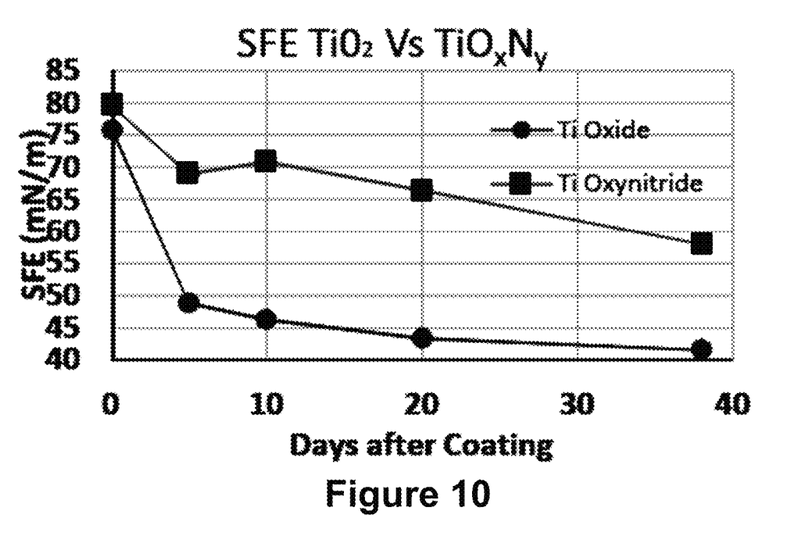
FIG. 10 is a comparative graph showing surface free energies of the surfaces over time when coated with an AR coating containing $SiO_2$ and either titanium dioxide or titanium oxynitride. The outer most layer is $SiO_2$ in the stack design.
Figure 11:
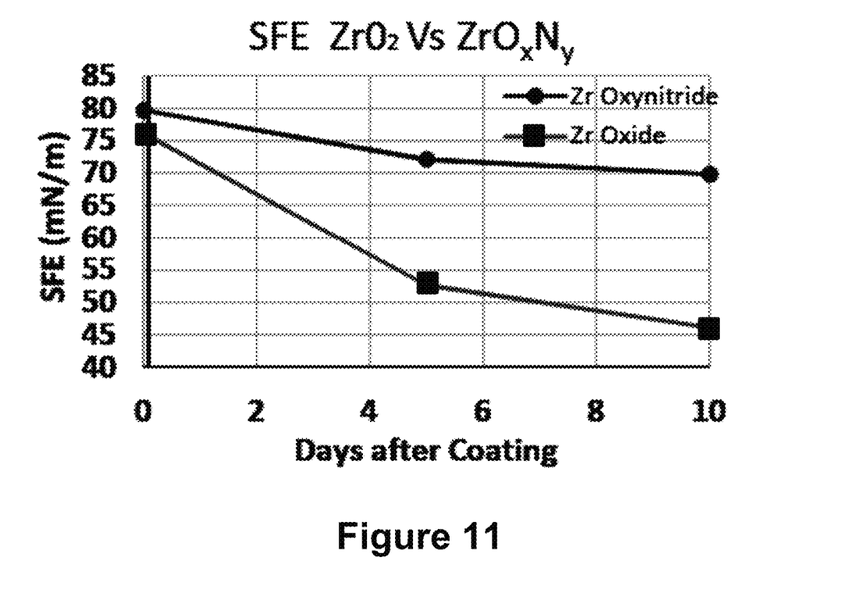
FIG. 11 is a comparative graph showing surface free energies of the surfaces over time when coated with an AR coating containing $SiO_2$ and either zirconium oxide or zirconium oxynitride. The outer most layer is $SiO_2$ in the stack design.

FIGS. 10 and 11 of this invention show comparative experiments of the measured total surface free energy (SFE) over a period of time between a stack including high refractive index layers of titanium dioxide and titanium oxynitride (FIG. 10) and a stack including high refractive index layers of zirconium dioxide and zirconium oxynitride (FIG. 11). FIG. 10 shows that the measured total surface free energy (SFE) for the stack of titanium oxynitride layers are much higher than the measured total surface free energy (SFE) for the stack of titanium dioxide layers after 5 days, 10 days, 20 days and nearly 40 days of the start of the experiment. Similarly, FIG. 11 shows that the measured total surface free energy (SFE) for the stack of zirconium oxynitride layers are much higher than the measured total surface free energy (SFE) for the stack of zirconium dioxide layers after 5 days and 10 days of the start of the experiment. In some embodiments, the resulting total surface energy of the metal (Ti/Zr) oxynitrides based antireflective structures is between about 50-70 mN/m.

Figure 12:
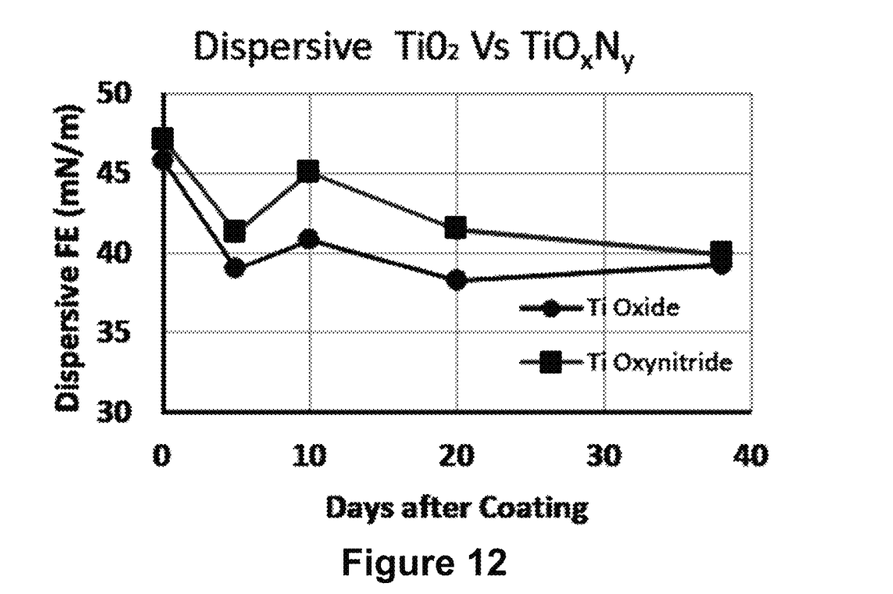
FIG. 12 is a comparative graph showing free energies of dispersive components of the surfaces over time when coated with an AR coating containing $SiO_2$ and either titanium dioxide or titanium oxynitride. The outer most layer is $SiO_2$ in the stack design.
Figure 13:
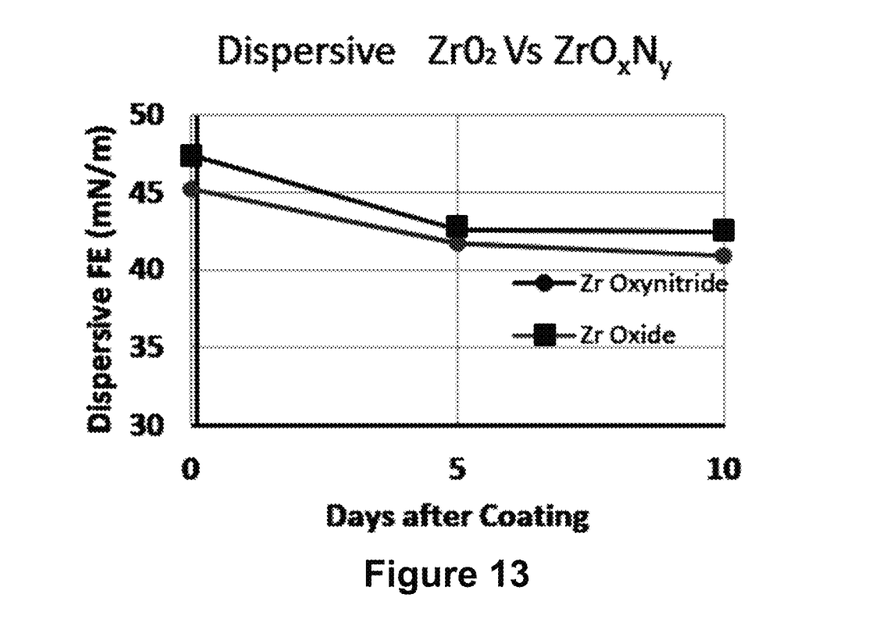
FIG. 13 is a comparative graph showing free energies of dispersive components of the surfaces over time when coated with an AR coating containing $SiO_2$ and either zirconium oxide or zirconium oxynitride. The outer most layer is $SiO_2$ in the stack design.

FIGS. 12 and 13 of this invention show comparative experiments of the measured dispersive components surface energy over a period of time between at stack including high refractive index layers of titanium dioxide and titanium oxynitride (FIG. 12) and a stack including high refractive index layers of zirconium dioxide and zirconium oxynitride (FIG. 13). FIG. 12 shows that the measured dispersive components surface energies between layers of titanium dioxide and titanium oxynitride coalesce to about 40 mN/m after nearly 40 days of the start of the experiment. Similarly, FIG. 13 shows that the measured dispersive components surface energies between layers of zirconium dioxide and zirconium oxynitride do not differentiate much after 5 days and 10 days of the start of the experiment. These experiments shown in FIGS. 12 and 13 illustrate that the dispersive component of surface energy has little effect or variation between the stacks made of the layers of titanium dioxide and titanium oxynitride or the stacks made of the layers of zirconium dioxide and zirconium oxynitride over time. From this experiment, it may be concluded that the dispersive interactions (for example, van der Waals interactions) among atoms and molecules caused by temporary fluctuations of the charge distribution have very little difference between layers of metal oxide and metal oxynitrides where the metals are taken from at least, but not limited to titanium and zirconium.

Figure 14:
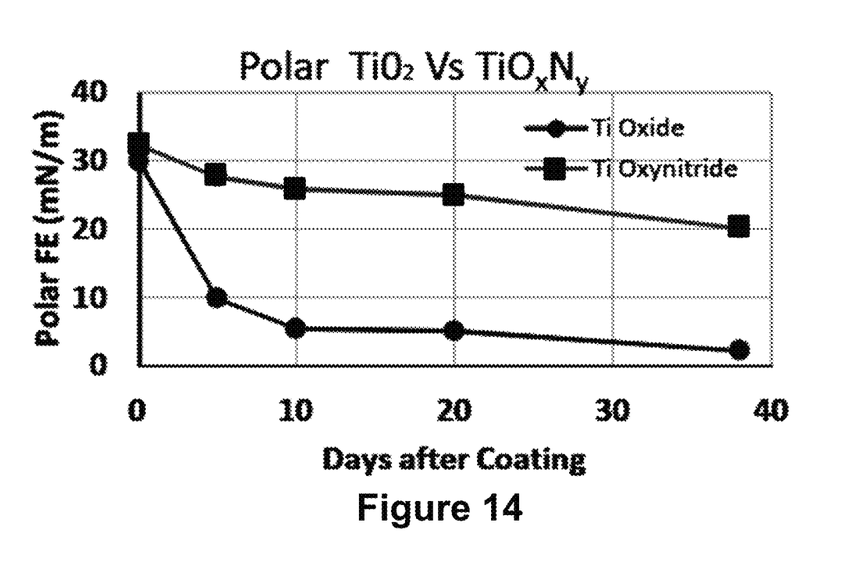
FIG. 14 is a comparative graph showing free energies of polar components of the surfaces over time when coated with $SiO_2$ and either titanium dioxide or titanium oxynitride. The outer most layer is $SiO_2$ in the stack design.
Figure 15:
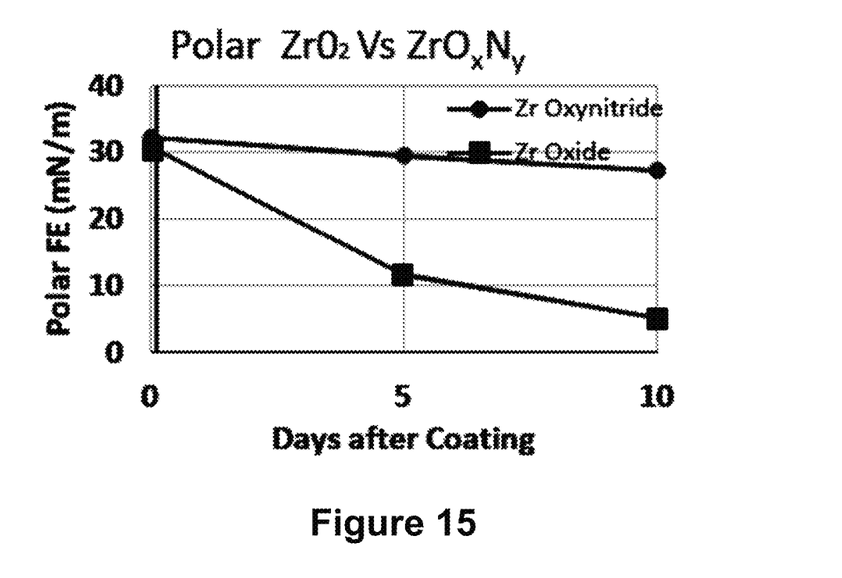
FIG. 15 is a comparative graph showing free energies of polar components of the surfaces over time when coated with $SiO_2$ and either zirconium oxide or zirconium oxynitride. The outer most layer is $SiO_2$ in the stack design.

FIGS. 14 and 15 of this invention show comparative experiments of the measured polar components surface energy over a period of time between high refractive index layers of titanium dioxide and titanium oxynitride (FIG. 14) and high refractive index layers of zirconium dioxide and zirconium oxynitride (FIG. 15). FIG. 14 shows that the measured polar components surface energies of titanium oxynitride is much higher than the measured polar components surface energies of titanium dioxide after 5 days, 10 days, 20 days and nearly 40 days of the start of the experiment. Similarly, FIG. 15 shows that the measured polar components surface energies of zirconium oxynitride is much higher than the measured polar components surface energies of zirconium dioxide after 5 days and 10 days of the start of the experiment. From this experiment, it may be concluded that the polar interactions (for example, hydrogen bonds) between permanent dipoles and between permanent and induced dipoles is much higher for a layer of zirconium oxynitride than a layer of zirconium dioxide.

The graphs in FIGS. 14 and 15 show that with the coatings using only the high index metal (Ti/Zr) oxides, the polar energy decreases over time approaching to zero, which tends to result in decreased hydrophilic characteristics. In contrast, the metal (Ti/Zr) oxynitrides show an initial reduction in the polar surface energy and then the polar surface energy stabilizes at a much higher non-zero value, which helps maintain more stable hydrophilic characteristics. In some embodiments, the polar energy of the metal (Ti/Zr) oxynitrides is between about 15-40 mN/m. According to some embodiments of this invention, the stability of the polar component energy of the metal (Ti/Zr) oxynitrides may be dependent on the optimum amount of nitrogen used in the preparation of the metal (Ti/Zr) oxynitride thin film. If more than this amount of nitrogen is used in the sputtering process, the hydrophilic characteristic of the metal (Ti/Zr) oxynitride films may not be stable and the controlled total surface energy of the metal (Ti/Zr) oxynitride films of about 50-70 mN/m range may not be obtained.

It should be noted that the presence of a $SiO_2$ layer alone in the optical stack will render a hydrophilic like property to the anti-reflection optical stack for a short period of time and then this hydrophilic property will diminish over time. Description of FIGS. 6-15 above shows that the presence of high refractive index metal-oxynitride coatings embedded between $SiO_2$ layers create permanency to the hydrophilic like behavior of the anti-reflection optical stacks. When the high refractive index metal-oxynitride encapsulated in between $SiO_2$ layers, the combined layers work synergistically together. In all the above described anti-reflection optical stacks in FIGS. 6-15, the top layer always remains $SiO_2$. The surface energy data from FIGS. 10-15 shows that the use of the oxynitride coating leads to an increase in the surface energy for the entire anti-reflection optical stack.

Figure 16:
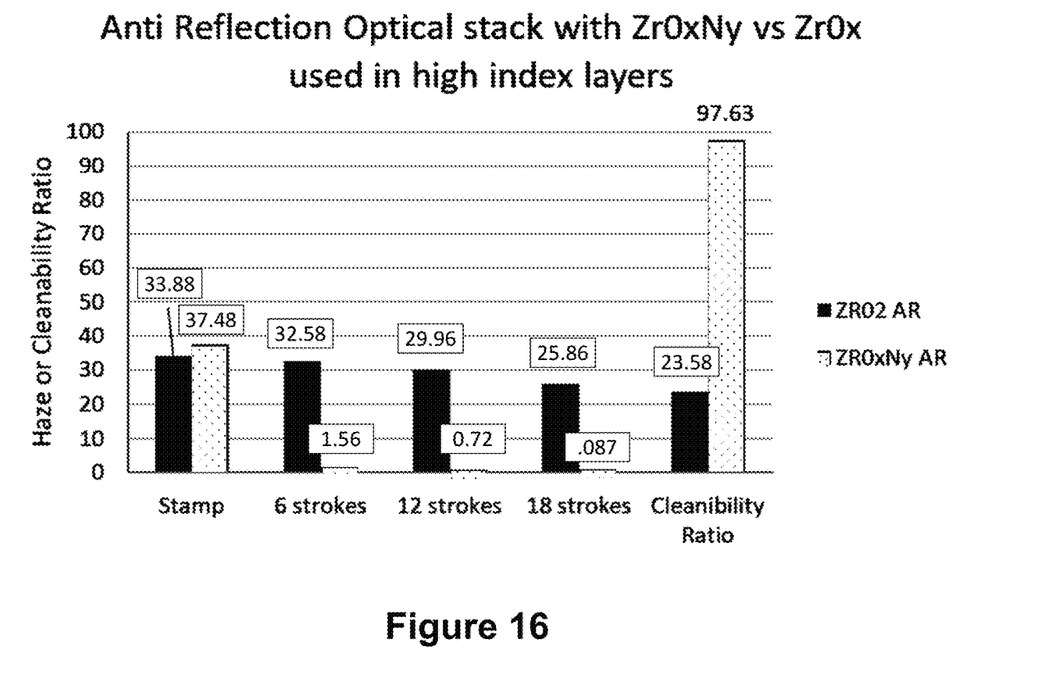
FIG. 16 is a comparative graph showing cleanability ratios between zirconium oxide or zirconium oxynitride used as the high refractive index layers in the antireflective and easy cleaning stack. The outer most layer is $SiO_2$ in the stack design.

Referring now to FIG. 16 of this invention, this figure shows a cleanability test which is employed to determine the ease of removing oily residue from a lens surface. At the beginning of this experiment, a synthetic skin oil (sebum) is applied using a tampo rubber stamper. The use of the tampo stamper is needed to apply a controlled amount sebum giving a predictable amount of optical haze. The sebum temperature is controlled at 60° C. Lenses with either a base curve of 4 or 6 diopters were used. Limiting the curve range improves repeatability of the test. The optical haze of the sample was then measured three times after turning the lens 120 degrees. The average of these measurements is the reported initial haze. The sample is placed in a rub testing system with 2.2 kg weight on top of a soft form pad with a polyester cloth with the weave running across the sample in 90° angle to the stroke. After six strokes the cloth is changed, and haze was measured. At the end of 18 strokes, the finial haze measurement is taken. In some embodiments of the invention, the stamping of the sebum should be ~35% transmission using the haze guard. This is because some of the surfaces having some different textures. Heating the sebum and stamping pressure aids in the uniformity and reproducibly of the haze starting point. As stated above the sample is rotated ~120 degrees on each haze measurement and the average is taken. In hydrophobic samples, measurements of the haze sometimes get worst due to the smearing of the sebum. This is one of the major drawbacks of the hydrophobic coating in which oil and dirt tend to move around on the surface because of the low surface energy.

From the haze readings after initial stamping and after 18 strokes with a polyester cloth, a cleanability ratio may be calculated by subtracting 18 strokes finial haze reading from the initial stamp haze reading, and dividing the result by initial stamp haze reading and multiplying by 100, which is represented here by the mathematical equation of "Cleanability Ratio"=(Initial reading-final reading)/initial reading*100.

The above equation is used to compare the "Cleanability Ratios" of different materials, lenses of different manufactures and manufacturing processes. FIG. 16 shows a comparison of the "Cleanability Ratios" of zirconium oxynitride vs the zirconium dioxide used as the high index layers of the anti-reflective structures. FIG. 16 further shows that the initial haze reading of the stack of anti-reflective structure prepared using zirconium oxide as the high refractive index layer being 33.88 and the initial haze reading of the stack of anti-reflective structure prepared using zirconium oxynitride as the high refractive index layer being 37.88. After 18 strokes with a polyester cloth, the haze reading of the stack of anti-reflective structure prepared using zirconium oxide as the high refractive index layer being 23.58 and the haze reading of the stack of anti-reflective structure prepared using zirconium oxynitride as the high refractive index layer being 0.87. The "Cleanability Ratios" were calculated using the above equation and FIG. 16 shows that the "Cleanability Ratio" of the stack of anti-reflective structure prepared by using high index zirconium oxynitride layers is much higher (97.63) than the "Cleanability Ratio" of the stack of anti-reflective structure prepared by using high index zirconium dioxide layers.

Figure 17:
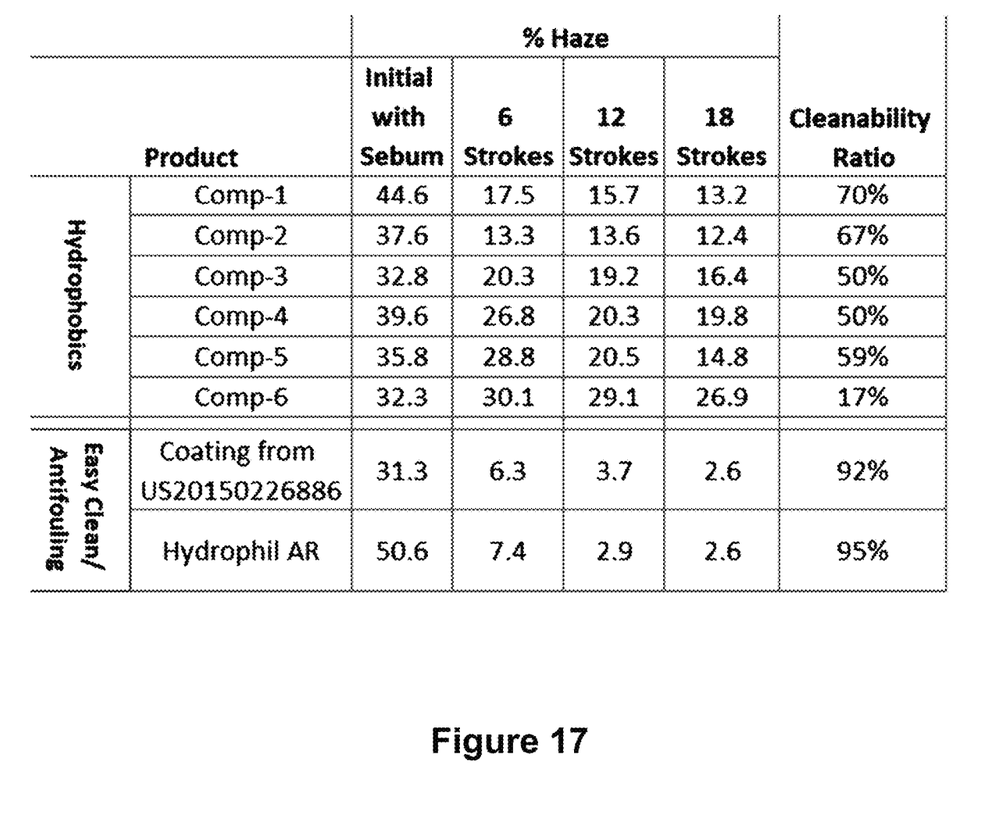
FIG. 17 is a Table showing comparison of cleanability ratios among competitors' hydrophobic coatings, the easier to clean coating in earlier U.S. Pat. No. 10,613,255B2, and the coatings disclosed in the present invention (labeled "Hydrophil AR").

FIG. 17 shows comparison of cleanability ratios among competitors' hydrophobic coatings, easier-to-clean coating in Applicant's earlier application U.S. Pub. No. 2015/0226886, the content of which is incorporated herein by reference, and the coatings disclosed in the present invention (labeled Hydrophil AR). It may be concluded from FIG. 17 that both the easier to clean coatings in Applicant's earlier application U.S. Pub. No. 2015/0226886 and the easier-to-clean coating of the present invention (labeled Hydrophil AR) provide surfaces which are more effectively cleaned by wiping than the industry standard hydrophobic coatings shown in comparative examples of 1-6 in FIG. 17. For example, the cleanability ratios of the industry standard hydrophobic coatings, shown in comparative examples of 1-6, are in the ranges between 17%-70%. Whereas the cleanability ratios of the Applicant's application U.S. Pub. No. 2015/0226886 and the present invention are 92% and 95%, respectively. Hence, the lens according to the present invention shows greater cleanability than the currently marketed "easy-cleaning" lenses tested.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An ophthalmic article, comprising:
a substrate having a top surface;
a plurality of alternating a low refractive index layer and a high refractive index layer deposited on the top surface;
wherein the high refractive index layer comprises a) at least one metal oxynitride layer, or b) at least one metal oxynitride layer and a metal oxide layer; and
wherein the at least one metal oxynitride layer comprising a zirconium oxynitride layer or a titanium oxynitride layer is positioned between two low refractive index layers to provide a surface free energy to the ophthalmic article in a range of about 50-70 mN/m for a prolonged period.

2. The ophthalmic article of claim 1, wherein the ophthalmic article comprises a hydrophilic property and an antireflective property.

3. The ophthalmic article of claim 1, wherein the low refractive index layer comprises a metal oxide layer.

4. The ophthalmic article of claim 3, wherein the low refractive index layer comprising the metal oxide layer includes silicon dioxide.

5. The ophthalmic article of claim 1, wherein the high refractive index layer comprising the metal oxide layer further comprises a titanium dioxide layer or a zirconium dioxide layer.

6. The ophthalmic article of claim 1, wherein the zirconium oxynitride layer or titanium oxynitride layer positioned between the two low refractive index layers to provide a polar surface energy to the ophthalmic article in a range of about 15-40 mN/m for a prolonged period.

7. The ophthalmic article of claim 1, wherein the zirconium oxynitride layer or the titanium oxynitride layer positioned between the two low refractive index layers to provide a surface cleanability ratio of greater than 90% of the ophthalmic article.

8. The ophthalmic article of claim 2, wherein the ophthalmic article is easy to clean because of the hydrophilic property.

9. An anti-reflective and easy-cleaning coating on a surface of an ophthalmic lens, comprising:
at least one high refractive index layer comprising a metal oxynitride layer encapsulated between two low refractive index layers;
wherein the at least one high refractive index layer comprising the metal oxynitride layer further comprises a zirconium oxynitride layer or a titanium oxynitride layer and the two low refractive index layers comprise a silicon dioxide layer to obtain a surface free energy of the ophthalmic lens in a range of about 50-70 mN/m for about 40 days of time.

10. The anti-reflective and easy-cleaning coating of claim 9, wherein the two low refractive index layers comprise silicon dioxide.

11. The anti-reflective and easy-cleaning coating of claim 9, wherein the anti-reflective and easy-cleaning coating further comprises a second high refractive index layer comprising a metal oxide layer.

12. The anti-reflective and easy-cleaning coating of claim 11, wherein the second high refractive index layer comprising the metal oxide layer further comprises a titanium dioxide layer or a zirconium dioxide layer.

13. The anti-reflective and easy-cleaning coating of claim 9, wherein a surface cleanability ratio of the ophthalmic lens is greater than 90%.

14. The anti-reflective and easy-cleaning coating of claim 9, wherein the ophthalmic lens comprises hydrophilic property.

15. The anti-reflective and easy-cleaning coating of claim 9, wherein a polar surface energy of the ophthalmic lens remains in a range of about 15-40 mN/m for about 40 days of time.

16. The anti-reflective and easy-cleaning coating of claim 11, wherein the high refractive index layer of the metal oxynitride and the second high refractive index layer of the metal oxide have about the same refractive indexes in a range of about 2.1276 to 2.1308.

* * * * *